(12) United States Patent
Liu et al.

(10) Patent No.: US 12,173,447 B2
(45) Date of Patent: Dec. 24, 2024

(54) DRYING AIR DUCT, CLOTHING TREATMENT DEVICE, AND METHOD FOR CLEANING DRYING AIR DUCT

(71) Applicant: GREE ELECTRIC APPLIANCES, INC. OF ZHUHAI, Guangdong (CN)

(72) Inventors: Jian Liu, Zhuhai (CN); Binhua Long, Zhuhai (CN); Weifeng Zhu, Zhuhai (CN); Ying Feng, Zhuhai (CN); Tan Chen, Zhuhai (CN)

(73) Assignee: GREE ELECTRIC APPLIANCES, INC. OF ZHUHAI, Guangdong (CN)

( * ) Notice: Subject to any disclaimer, the term of this patent is extended or adjusted under 35 U.S.C. 154(b) by 323 days.

(21) Appl. No.: 17/621,090

(22) PCT Filed: Jun. 8, 2020

(86) PCT No.: PCT/CN2020/094971
§ 371 (c)(1),
(2) Date: Dec. 20, 2021

(87) PCT Pub. No.: WO2021/047220
PCT Pub. Date: Mar. 18, 2021

(65) Prior Publication Data
US 2022/0356636 A1    Nov. 10, 2022

(30) Foreign Application Priority Data
Sep. 9, 2019    (CN) .......................... 201910849683.0

(51) Int. Cl.
*D06F 58/45* (2020.01)
*D06F 33/69* (2020.01)
(Continued)

(52) U.S. Cl.
CPC .............. *D06F 58/45* (2020.02); *D06F 33/69* (2020.02); *D06F 33/74* (2020.02); *D06F 58/24* (2013.01);
(Continued)

(58) Field of Classification Search
CPC .......... D06F 58/45; D06F 58/24; D06F 53/74; D06F 33/69; D06F 58/26; D06F 2105/28;
(Continued)

(56) References Cited

U.S. PATENT DOCUMENTS 1,928,375 A * 9/1933 Hall .................... B61D 27/0072
62/394
2,910,854 A * 11/1959 Hughes ................... D06F 58/22
34/79
(Continued)

FOREIGN PATENT DOCUMENTS

| CN | 103797174 A | 5/2014 |
|----|-------------|--------|
| CN | 105506939 A | 4/2016 |

(Continued)

OTHER PUBLICATIONS

English translation of Office Action for Japanese Application No. 2021-574977 dated Mar. 7, 2023 (6 pages).
(Continued)

*Primary Examiner* — Stephen M Gravini
(74) *Attorney, Agent, or Firm* — J. Miguel Hernandez; James R. Gourley; Carstens, Allen & Gourley, LLP (57) ABSTRACT

A drying air duct, a clothing treatment device and a method for cleaning a drying air duct are provided. The drying air duct includes a condensing section air duct, a heating section air duct and a fan; the fan is provided at a connection position of the condensing section air duct and the heating section air duct, a cleaning device is provided in the condensing section air duct, the cleaning device is provided at
(Continued)

an end of the condensing section air duct adjacent to the fan and is capable of cleaning a side of the condensing section air duct away from the fan. The drying air duct can effectively clean the pipe sudden expansion area of the condensing section air duct, preventing the accumulation of soft flocks in the condensing section air duct.

10 Claims, 5 Drawing Sheets

(51) Int. Cl.
  *D06F 33/74* (2020.01)
  *D06F 58/24* (2006.01)
  *D06F 58/26* (2006.01)
  *D06F 103/32* (2020.01)
  *D06F 103/36* (2020.01)
  *D06F 105/28* (2020.01)
  *D06F 105/30* (2020.01)
(52) U.S. Cl.
  CPC .......... *D06F 58/26* (2013.01); *D06F 2103/32* (2020.02); *D06F 2103/36* (2020.02); *D06F 2105/28* (2020.02); *D06F 2105/30* (2020.02)
(58) Field of Classification Search
  CPC ............. D06F 2105/30; D06F 2103/32; D06F 2103/36
  USPC .......................................................... 34/427
  See application file for complete search history.

(56) References Cited

U.S. PATENT DOCUMENTS

| | | | | |
|---|---|---|---|---|
| 4,483,160 A | * | 11/1984 | Jost | D06F 43/085 68/18 F |
| 5,159,766 A | * | 11/1992 | Henig | F26B 21/08 34/604 |
| 5,940,988 A | * | 8/1999 | Eisen | D06F 43/007 68/19.2 |
| 8,266,813 B2 | * | 9/2012 | Grunert | D06F 58/206 68/5 R |
| 8,800,165 B2 | * | 8/2014 | Kwon | D06F 29/005 68/12.12 |
| 9,335,095 B2 | * | 5/2016 | Bison | D06F 39/12 |
| 9,567,700 B2 | * | 2/2017 | Hong | D06F 43/088 |
| 11,390,975 B2 | * | 7/2022 | Hahm | D06F 58/22 |
| 2020/0348078 A1 | * | 11/2020 | Alves-Filho | F26B 17/04 |
| 2022/0356636 A1 | * | 11/2022 | Liu | D06F 58/26 |
| 2023/0190074 A1 | * | 6/2023 | Jeong | A61L 9/20 62/132 |

FOREIGN PATENT DOCUMENTS

| | | | | |
|---|---|---|---|---|
| CN | 108486840 A | | 9/2018 | |
| CN | 208414916 U | | 1/2019 | |
| CN | 109518439 A | | 3/2019 | |
| CN | 109518441 A | | 3/2019 | |
| CN | 109554901 A | | 4/2019 | |
| CN | 110438781 A | * | 11/2019 | ............ D06F 33/69 |
| CN | 210561327 U | | 5/2020 | |
| EP | 0485700 A1 | | 5/1992 | |
| JP | 49135866 U | | 11/1974 | |
| JP | 2005-21601 A | | 1/2005 | |
| JP | 2009213633 A | * | 9/2009 | |
| JP | 2014028013 A | | 2/2014 | |
| JP | 2015024116 A | | 2/2015 | |
| JP | 2022539682 A | * | 9/2022 | |
| WO | 2005090670 A2 | | 9/2005 | |
| WO | 2005090670 A3 | | 9/2005 | |
| WO | WO-2019143254 A1 | * | 7/2019 | ............ B01D 45/16 |
| WO | WO-2021047220 A1 | * | 3/2021 | ............ D06F 33/69 |

OTHER PUBLICATIONS

Office Action for Japanese Application No. 2021-574977 dated Mar. 7, 2023 (5 pages).

* cited by examiner

DRYING AIR DUCT, CLOTHING TREATMENT DEVICE, AND METHOD FOR CLEANING DRYING AIR DUCT

CROSS-REFERENCE TO RELATED APPLICATION

This application is a U S. National Stage of International Application No. PCT/CN2020/094971, filed on Jun. 8, 2020, entitled "Drying Air Duct, Clothing Treatment Device, and Method for Cleaning Drying Air Duct" and published as WO 2021/047220 A1 on Mar. 18, 2021, which claims priority to Chinese patent application No. 201910849683.0, titled "Drying Air Duct, Clothing Treatment Device, and Method for Cleaning Drying Air Duct", and filed on Sep. 9, 2019, the content of which is hereby incorporated by reference in its entirety. Every patent application and publication listed in this paragraph is hereby incorporated by reference in its entirety, as an example.

TECHNICAL FIELD

The present disclosure relates to the technical field of laundry device, and particularly to a drying air duct, a clothing treatment device, and a method for cleaning a drying air duct.

BACKGROUND

In recent years, in the continuous development process of the washing machine market, the consumption upgrades catalyzed by the demand for quality of life have made the washing machine industry continue to innovate and develop technologies for the needs of healthy washing and care. Specifically, the demand for washer-dryers has grown particularly impressive.

At present, the drying modes of the air duct of the electric heating washer-dryer known to the inventors mainly include: the tap water cools the humid air, humid air is discharged outside, and the ordinary refrigeration system performs the dehumidification. The washing and drying integrated machine using the mode of cooling the humid air with the tap water has the largest market share.

Under the action of airflow, the soft flocks mainly adhere to the surrounding walls of the air duct of the condensing section, especially the area where the wind speed suddenly decreases, that is, the area where the pipe suddenly expands. However, there is currently no solution for cleaning such area.

SUMMARY

In view of this, the technical problem to be solved by the present disclosure is to provide a drying air duct, a clothing treatment device, and a method for cleaning a drying air duct, which can effectively clean the sudden expansion area of the condensing section air duct, and avoid accumulation of the soft flocks in the condensing section air duct.

In order to solve the above problems, a drying air duct is provided, including a condensing section air duct, a heating section air duct and a fan, wherein the fan is provided at a connection position of the condensing section air duct and the heating section air duct, a cleaning device is provided in the condensing section air duct, the cleaning device is provided at an end of the condensing section air duct adjacent to the fan and is capable of cleaning a side of the condensing section air duct away from the fan.

In some embodiments, the cleaning device comprises a spray pipe which is provided in the condensing section air duct, the spray pipe comprises a pipe body and a spray hole, and the spray hole is located on a side of the pipe body away from the fan.

In some embodiments, the pipe body is provided with a water inlet, and there are a plurality of spray holes, the plurality of spray holes communicate with the water inlet through an inner cavity of the pipe body, and the plurality of spray holes are spaced in length and width directions of the pipe body.

In some embodiments, the pipe body is a round pipe, and the spray hole is a radial hole, the plurality of spray holes are evenly arranged in circumferential and axial directions of the pipe body, the spray holes are located in an area range of 90° to 150° on the pipe body in a circumferential direction.

In some embodiments, a bottom of the pipe body comprises two inclined plates forming a V shape, the two inclined plates are respectively provided with the spray holes, and the spray holes are perpendicular to a surface of the inclined plate where the spray holes are located, an angle between the two inclined plates is in a range of 60° to 150°.

In some embodiments, an end portion of the pipe body is provided with a connecting plate, and the connecting plate is provided with a connecting hole, the pipe body is fixedly connected to an air duct wall of the condensing section air duct through the connecting plate.

In some embodiments, a fixing frame is provided on an outer peripheral wall of the pipe body, a ventilation opening is provided on the fixing frame, and the pipe body is fixedly provided in the condensing section air duct through the fixing frame.

In some embodiments, the ventilation openings are located on both sides of the pipe body, and an airflow is guided by the pipe body to enter the fan from the ventilation openings on the both sides.

In some embodiments, the drying air duct further comprises an air-out section air duct, the air-out section air duct is provided at an air outlet of the heating section air duct, and the air-out section air duct is provided with a temperature sensor and an air velocity sensor.

In some embodiments, the temperature sensor and the air velocity sensor are located at the same height, and a cross section of the air-out section air duct is rectangular; in a horizontal cross section, a length of a long side of the air-out section air duct is L, and a length of a short side is h, a depth at which the temperature sensor and the air velocity sensor are inserted into the air-out air duct is H0, a distance between the temperature sensor and a first short side is L1, a distance between the air velocity sensor and the first short side is L2, wherein L1 ranges from 0.2L to 0.4L, L2 ranges from 0.6L to 0.8L, H0 ranges from 0.45h to 0.55h.

In another aspect of the present disclosure, a clothing treatment device is provided, including the above-mentioned drying air duct.

In another aspect of the present disclosure, a method for cleaning the drying air duct according is provided, including:
  acquiring an outlet air velocity in an air-out section air duct;
  comparing the acquired outlet air velocity V1 to a set air velocity U1 to obtain a comparison result;
  determining a cleaning strategy for the condensing section air duct according to the comparison result;
  cleaning the condensing section air duct according to the determined cleaning strategy.

In some embodiments, the determining the cleaning strategy for the condensing section air duct according to the comparison result comprises:

when $V1 \geq U1$, controlling the heater 14 to work and perform a normal drying procedure;

after completing the drying, turning off the heater and starting the cleaning device to perform the cleaning, meanwhile keeping operation of the fan;

detecting whether a cleaning time reaches a set time;

when the cleaning time reaches the set time, controlling the fan to turn off;

controlling the washing machine to stop operating;

when the cleaning time does not reach the set time, continuing the cleaning.

In some embodiments, the determining the cleaning strategy for the condensing section air duct according to the comparison result comprises:

when $V1 < U1$, starting the cleaning device to perform the cleaning and controlling the fan to start;

when completing the cleaning once, detecting the outlet air velocity V1 and an outlet temperature T;

when the outlet air velocity V1 satisfies $V1 < U2$ and $T > T0$, entering the cleaning step and accumulating a number of times of consecutive cleaning;

when the number of times of consecutive cleaning reaches a set number of times, and requirements for the air velocity and temperature are still not met, entering a step of reporting a fault, where $U1 < U2$.

The drying air duct provided by the disclosure includes a condensing section air duct, a heating section air duct and a fan; the fan is provided at a connection position of the condensing section air duct and the heating section air duct, a cleaning device is provided in the condensing section air duct, the cleaning device is provided at an end of the condensing section air duct adjacent to the fan and is capable of cleaning a side of the condensing section air duct away from the fan. In the drying air duct of the present disclosure, the cleaning device is provided at an end of the condensing section air duct adjacent to the fan, so that the sudden expansion area of the condensing section air duct with serious adhesion of the soft flocks can also be located within the cleaning range of the cleaning device. When cleaning the condensing section air duct, it can ensure that the cleaning device can fully clean the area with serious adhesion of the soft flocks, and can solve the problem of accumulation of the soft flocks in the condensing section air duct from the source, thereby avoiding the reduction of heat exchange efficiency, and reducing the possibility of secondary pollution in the cleaning process of the clothing, accordingly the stability of the drying function is guaranteed, the intelligent design of the washing machine is improved, and the user comfort experience is enhanced.

REFERENCE SIGNS ARE PROVIDED AS

1, condensing section air duct; 2. heating section air duct; 3, fan; 4, pipe body; 5, spray hole; 6, water inlet; 7, connecting plate; 8, connecting hole; 9, fixing frame; 10, ventilation opening; 11, air-out section air duct; 12, temperature sensor; 13, air velocity sensor; 14, heater; 15, condensate pipe; 16, air pipe; 17, temperature limiter.

DETAILED DESCRIPTION

With reference to FIGS. 1 to 5, according to an embodiment of the present disclosure, a drying air duct includes a condensing section air duct 1, a heating section air duct 2 and a fan 3. The fan 3 is provided at a connection position of the condensing section air duct 1 and the heating section air duct 1. A cleaning device is also provided in the condensing section air duct 1. The cleaning device is provided at an end of the condensing section air duct 1 adjacent to the fan 3, and is capable of cleaning a side of the condensing section air duct 1 away from the fan 3.

Figure 1:
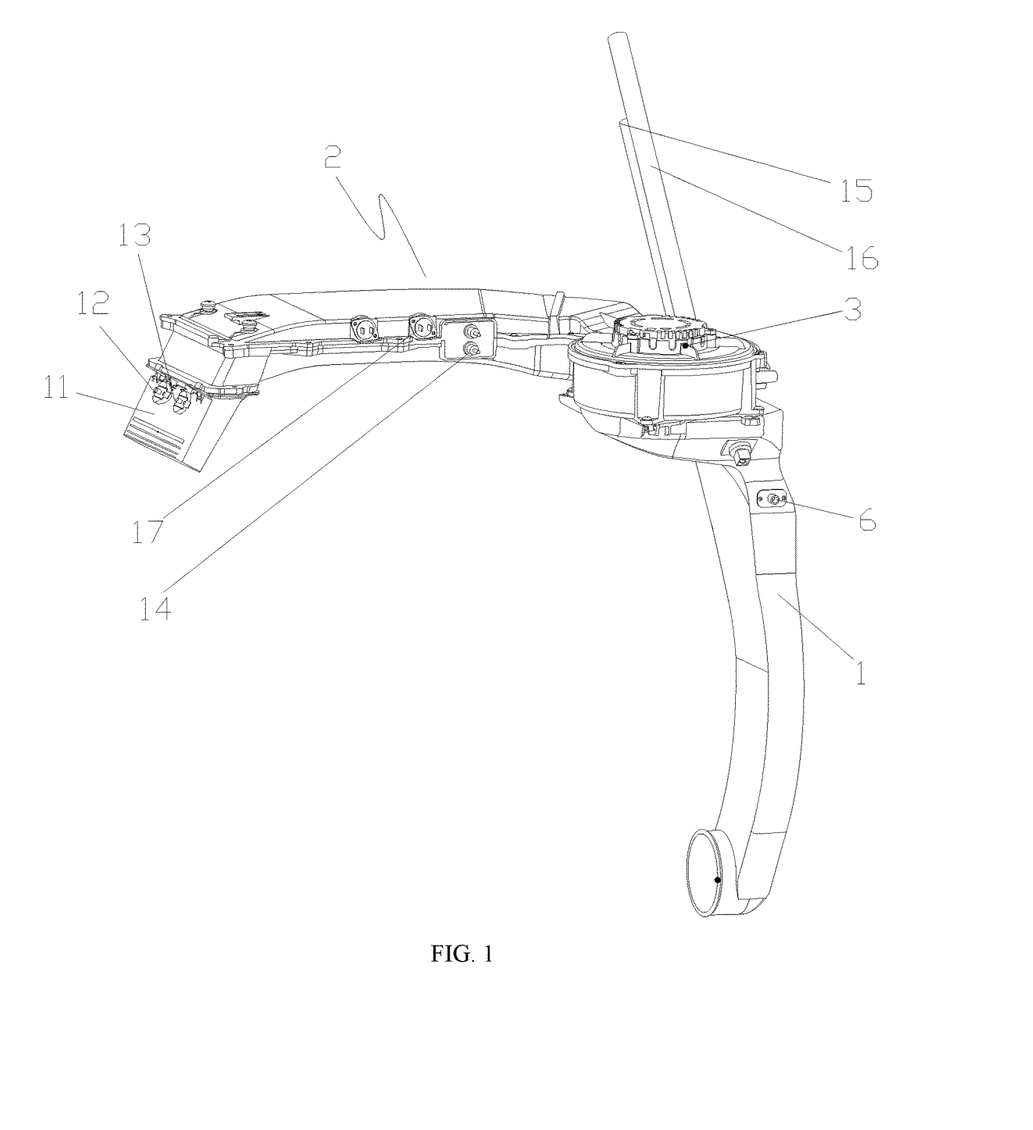
FIG. 1 is a schematic structure diagram of a drying air duct according to some embodiments of the present disclosure.

As for the drying air duct of the present disclosure, the cleaning device is provided at the end of the condensing section air duct 1 adjacent to the fan 3, so that a sudden expansion area of a pipeline of the condensing section air duct 1 with serious adhesion of the soft flocks can also be located within a cleaning range of the cleaning device. Therefore, when the condensing section air duct 1 is cleaned, it can be ensured that the cleaning device can fully clean the area with the serious adhesion of soft flocks, which can solve the problem of accumulation of the soft flocks in the condensing section air duct 1 from the source and avoid a reduction in a heat exchange efficiency. Accordingly, the possibility of secondary pollution during the laundry cleaning process is reduced, thereby ensuring the stability of the drying function, improving the intelligent design of the washing machine, and enhancing the user comfort experiences.

Figure 2:
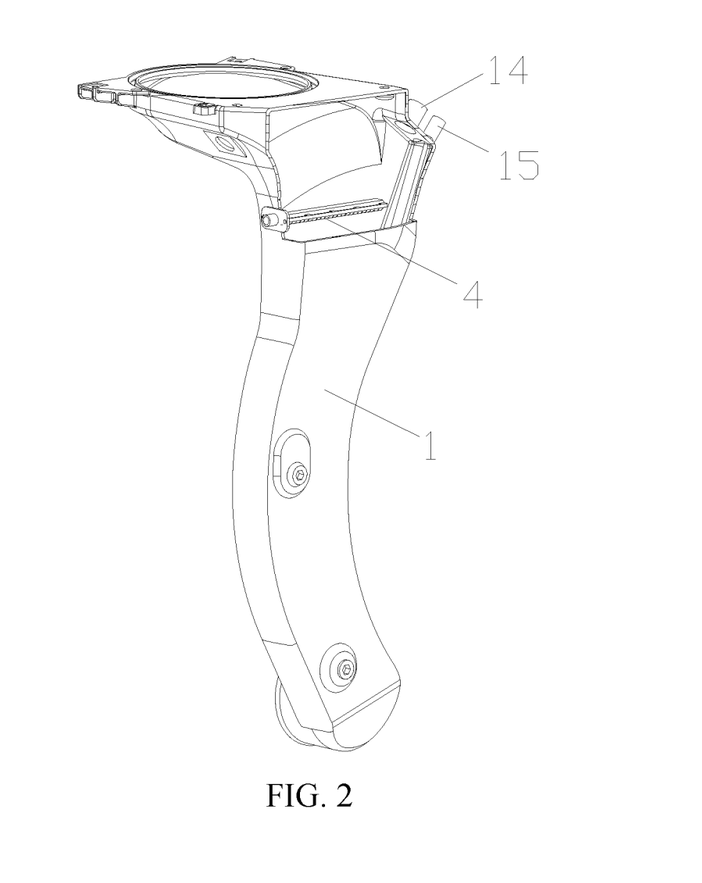
FIG. 2 is a schematic structure diagram of a condensation section air duct of a drying air duct according to some embodiments of the present disclosure.
Figure 3:
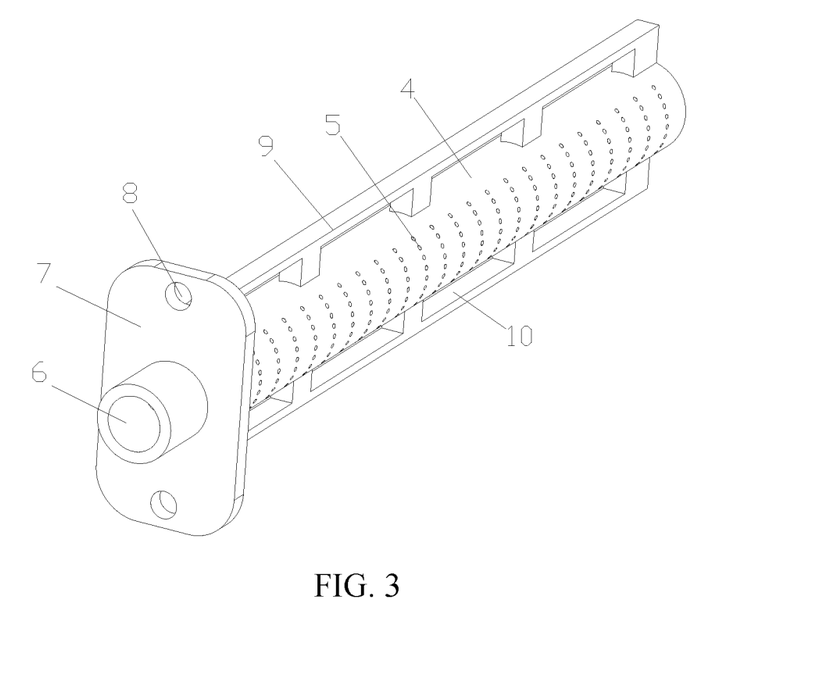
FIG. 3 is a schematic three-dimensional structure diagram of a cleaning device for a drying air duct according to some embodiments of the present disclosure.

The cleaning device includes a spray pipe which is provided in the condensing section air duct 1. The spray pipe includes a pipe body 4 and a spray hole 5; and the spray hole 5 is located on a side of the pipe body 4 away from the fan 3. In the embodiment, a side of the pipe body 4 facing the fan 3 is not provided with the spray hole 5, while only a side of the pipe body 4 facing away from the fan 3 is provided with the spray hole 5. In such a manner, when the cleaning water enters the pipe body 4, the cleaning water may spray out from the spray hole 5 in a direction away from the fan 3, thereby cleaning and removing the soft flocks in the condensing section air duct 1. Since the spray hole 5 is facing away from the fan 3, the spray hole 5 can effectively prevent the water flow of the spray hole 5 from spraying onto the fan 3, causing an adverse effect on the fan 3.

In some embodiments, the pipe body 4 is provided with a water inlet 6; and there are a plurality of spray holes 5. The plurality of spray holes 5 communicate with the water inlet 6 through an inner cavity of the pipe body 4; and the plurality of spray holes 5 are spaced in length and width directions of the pipe body 4. The spray holes 5 communicate with the water inlet 6 through the inner cavity of the pipe body 4; accordingly, the pipe body 4 can be used for flow redistribution, thereby ensuring that sufficient water flow can enter each spray hole 5 and improving the cleaning effect. The plurality of spray holes 5 spaced in the length and width directions of the pipe body 4 can enlarge the range of the spray area of the water flow of the pipe body 4, increase the spray area of the water flow, and increase the clean area of the condensing section air duct 1, and improving the cleaning efficiency.

Figure 4:
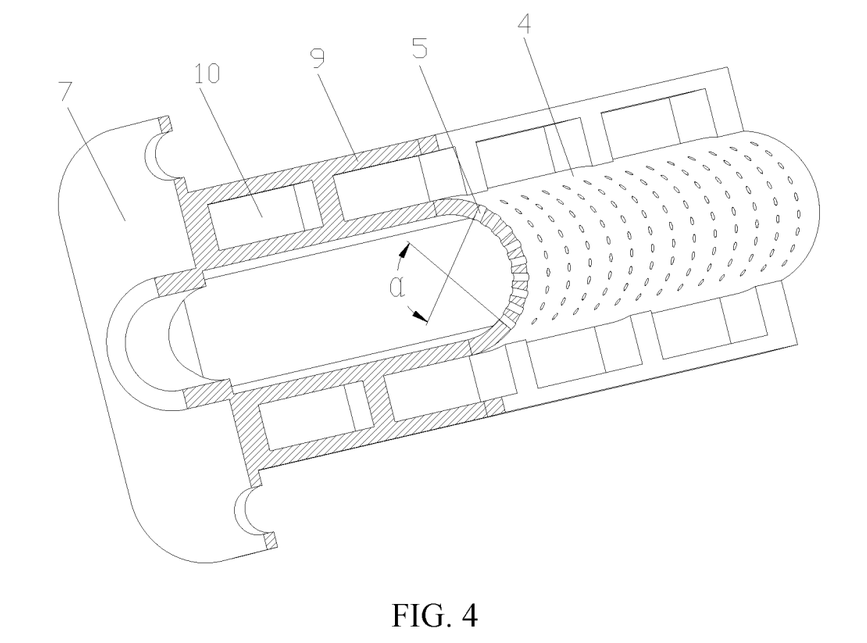
FIG. 4 is a schematic partial cross-sectional structure diagram of a cleaning device for a drying air duct according to some embodiments of the present disclosure.

In this embodiment, the pipe body 4 is a round pipe; and the spray hole 5 is a radial hole. The plurality of spray holes 5 are evenly arranged in circumferential and axial directions of the pipe body 4. In the circumferential direction, the spray holes 5 are located in an area range of 90° to 150° on the pipe body 4. The pipe body 4 is arranged horizontally, an opening of the spray hole 5 faces downwards; and a spray range with a certain angle is formed on a surface of the pipe body 4, which can ensure that the cleaning device flushes an inner wall surface of the condensing section air duct to the maximum extent, thereby improving a flushing efficiency, and enhancing the cleaning effect.

The spray holes 5 are arranged in the entire axial direction of the pipe body 4, so that the entire condensing section air duct 1 can be cleaned in the circumferential direction.

In addition, when the pipe body 4 has a round pipe structure, an arc-shaped surface of the round pipe can be utilized to guide and divert the airflow formed by the fan during the cleaning process. When the airflow reaches the position where the pipe body 4 is located, since the pipe body 4 is not ventilated, the airflow needs to flow through a channel between the pipe body 4 and the wall of the air duct. In this process, after reaching the pipe body 4 from a bottom of the pipe body 4, the airflow is divided to both sides under the guiding action of the pipe body 4. During the division of the airflow, the water flows from the spray holes 5 in the center may be driven to tilt to both sides, so that the spray holes 5 in the center can be driven by the airflow to spray to the air duct walls on both sides, which ensures that the water flows sprayed from the spray holes 5 can effectively act on the air duct wall, thereby having a more effective cleaning effect on the air duct wall, and improving the utilization efficiency of cleaning water flows.

In an embodiment not shown in the figures, the bottom of the pipe body 4 includes two inclined plates forming a V shape. The two inclined plates are respectively provided with spray holes 5, and the spray holes 5 are perpendicular to a surface of the inclined plate where the spray holes 5 are located. An angle between the two inclined plates is in a range of 60° to 150°. In this embodiment, the bottom of the pipe body 4 forms a V-shaped structure, which can form a good division effect, and can make the water flow toward the air duct wall. At the same time, the characteristics of the V-shaped structure can also be utilized to make the water flows spray to the surface of the air duct wall from the spray holes 5, thereby improving the cleaning effect of the air duct wall.

An end portion of the pipe body 4 is provided with a connecting plate 7; and the connecting plate 7 is provided with a connecting hole 8. The pipe body 4 is fixedly connected to the air duct wall of the condensing section air duct 1 through the connecting plate 7. The connecting hole 8 can be a light hole or a bolt hole, which can be specifically provided as required. The connecting plate 7 is fixedly connected to the air duct wall through the connecting hole 8 and the connecting bolt to complete the fixed installation of the pipe body 4. The water inlet 6 communicates with the pipe body 4 through the connecting plate 7. An installation port is provided on the air duct wall; and a connecting pipe extends from the connecting plate 7; and the water inlet 6 is located on the connecting pipe. The connecting pipe passes through the installation port on the air duct wall, and is convenient to connect with the water source, in order to supply water to the cleaning device.

A fixing frame 9 is provided on an outer peripheral wall of the pipe body 4; a ventilation opening 10 is provided on the fixing frame 9; and the pipe body 4 is fixedly provided in the condensing section air duct 1 through the fixing frame 9. In some embodiments, the fixing frame 9 is fixedly provided in the condensing section air duct 1 by means of a snap-fit manner, so that the pipe body 4 can be installed and fixed in the entire axial direction of the tube body 4, which can further ensure the fixed installation effect of the pipe body 4 on the air duct wall. In some embodiments, the pipe body 4 is fixedly installed by the fixing frame 9 alone, or is installed by means of the fixing frame 9 and the connecting plate 7 simultaneously. The existence of the ventilation opening 10 prevents the fixing frame 9 from obstructing the air flow channel, and ensures that the air flow can smoothly pass through the position of the cleaning device, so that the cleaning device can be installed smoothly, and the drying air duct can also operate smoothly.

The ventilation openings 10 are located on both sides of the pipe body 4, and the airflow is guided by the pipe body 4 to enter the fan 3 from the ventilation openings 10 on the both sides.

Figure 5:
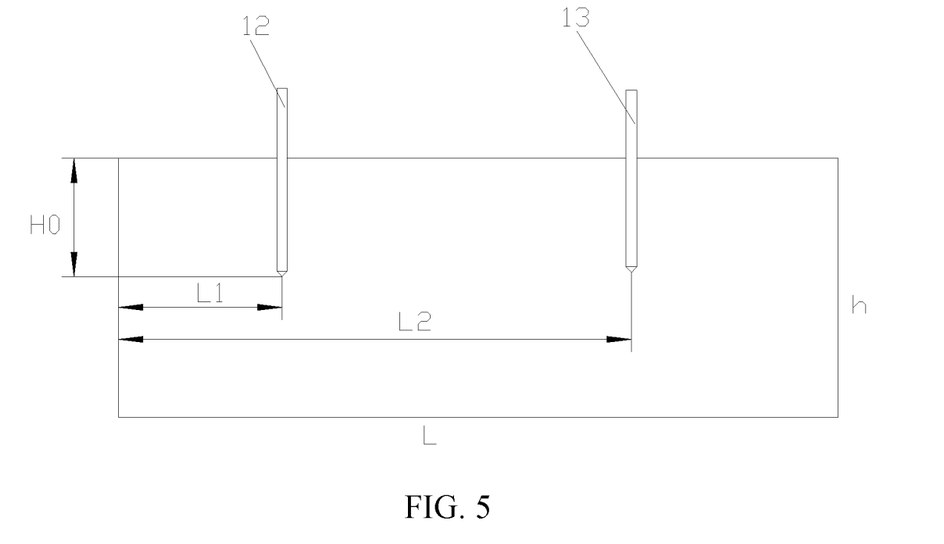
FIG. 5 is a schematic structure diagram of an arrangement of a sensor of a drying air duct according to some embodiments of the present disclosure.

The drying air duct also includes an air-out section air duct 11. The air-out section air duct 11 is provided at the air outlet of the heating section air duct 2; and the air-out section air duct 11 is provided with a temperature sensor 12 and an air velocity sensor 13. In this embodiment, the temperature sensor 12 and the air velocity sensor 13 are provided on the air-out section air duct 11, in order to detect the air velocity and airflow temperature at the air-out section air duct 11, and then determine whether a obstruction exists in the drying air duct, thereby implementing the automatic intelligent control of the cleaning device.

In some embodiments, the temperature sensor 12 and the air velocity sensor 13 are located at the same height; and a cross section of the air-out section air duct 11 is rectangular. In a horizontal cross section, a length of a long side of the air-out section air duct 11 is L, and a length of a short side is h. A depth at which the temperature sensor 12 and the air velocity sensor 13 are inserted into the air-out air duct 11 is H0; a distance between the temperature sensor 12 and a first short side is L1, and a distance between the air velocity sensor 13 and the first short side is L2, where L1 ranges from 0.2L to 0.4L, L2 ranges from 0.6L to 0.8L, H0 ranges from 0.45h to 0.55h.

By limiting the installation positions of the temperature sensor 12 and the air velocity sensor 13 in the air-out section air duct 11, it can be ensured that the position of the sensor is located near the middle of a wind field of the air outlet. Since the airflow velocity at this position is the largest, the airflow temperature and airflow velocity at this location are detected. When the obstruction occurs, changes in the temperature and airflow at this location are relatively more obvious, thereby improving the sensitivity of detecting whether the drying air duct is obstructed and the accuracy of the detection result, to ensure the control accuracy of the cleaning of the drying air duct.

In this embodiment, a condensate pipe 15 and an air pipe 16 are further provided on the condensing section air duct 1; and a heater 14 and a temperature limiter 17 are further provided on the heating section air duct 2. A temperature sensing bulb is further installed on the condensing section air duct 1; and the condensing section air duct 1 further includes an air duct air inlet; and the air-out section air duct 11 further includes an air duct air outlet. The air duct air inlet and the air duct air outlet are connected to the washing machine and the drum through hoses, to form a flow field loop of the entire washing machine.

When the washing machine performs the drying, the hot and humid air passing through the inner drum passes through the condensing section air duct 1, and is cooled by the water sprayed from the condensate pipe 15 to become damp and cold air, and then the damp and cold air passes through the heater 14 of the heating section air duct 2 to become hot dry air. The hot dry air enters the drum through the air-out section air duct 11 to dry the clothing. During the drying process, due to the interaction between the clothing and the drum, there are more soft flocks in the air duct, which may have a greater impact on the performance of the air duct of the washing and drying integrated machine.

By adopting the technical solution of the present disclosure, the washing machine can control a valve connected to the cleaning device trough programs to achieve the purpose of autonomous cleaning to remove the soft flocks.

According to an embodiment of the present application, the clothing treatment device includes a drying air duct, and the drying air duct is the above-mentioned drying air duct. The above-mentioned clothing treatment device is, for example, a washing machine, a dryer, or a washing and drying integrated machine.

Figure 6:
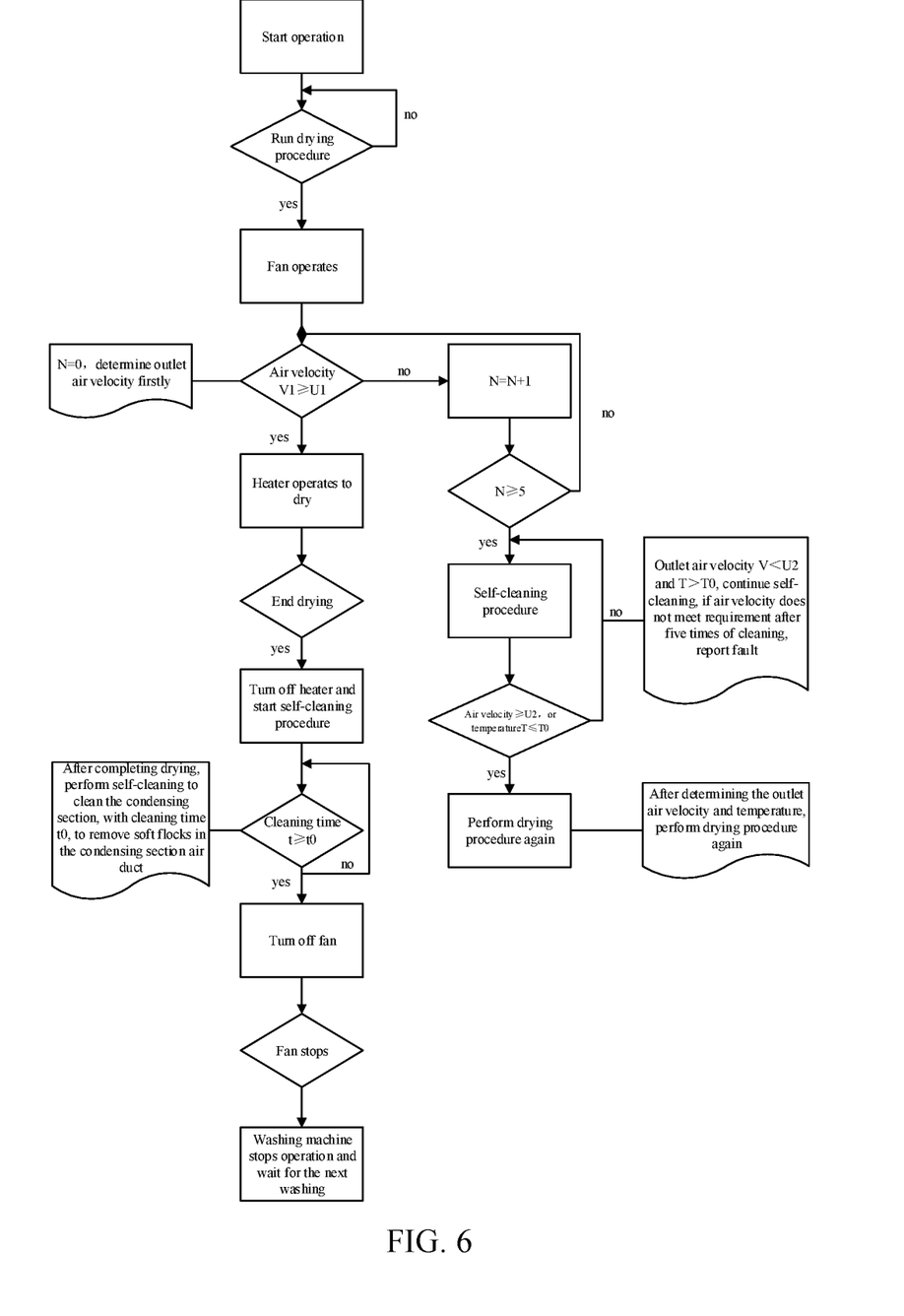
FIG. 6 is a flow chart showing a method for cleaning a drying air duct according to some embodiments of the present disclosure.

Referring to FIG. 6, according to an embodiment of the present disclosure, the method for cleaning the drying air duct described above includes: an outlet air velocity in an air-out section air duct is acquired, the acquired outlet air velocity V1 is compared to a set air velocity U1 to obtain a comparison result; a cleaning strategy for the condensing section air duct 1 is determined according to the comparison result; the condensing section air duct 1 is cleaned according to the determined cleaning strategy.

During the drying operation of the washing machine, the soft flocks adhered to the inner wall of the condensing section air duct 1 may cause changes in the flow, which affects the outlet air velocity and temperature. If the soft flocks are adhered to the condensing section air duct 1, the outlet air velocity may be reduced while the outlet temperature is increased. The temperature sensor 12 and the air velocity sensor 13 can reflect the air velocity and temperature in real time, and then the cleaner can be controlled to wash the inner wall surface within the condensing section air duct. In such a manner, the cleaning can be performed timely when the soft flocks obstruct the condensing section air duct 1 of the drying air duct, in order to avoid affecting the working performance of the drying air duct.

The step of determining the cleaning strategy for the condensing section air duct 1 according to the comparison result includes: when V1≥U1, the heater 14 is controlled to work and perform a normal drying procedure; after the drying is completed, the heater 14 is turned off and the cleaning device is started to clean, meanwhile the fan 3 keeps running; it is detected whether the cleaning time reaches the set time; when the cleaning time reaches the set time, the fan 3 is controlled to turn off; the washing machine is controlled to stop operating; when the cleaning time does not reach the set time, the cleaning step is continued.

When V1≥U1, it indicates that there is no obstruction in the drying air duct, or there are fewer soft flocks, which does not affect the working performance of the drying air duct. Therefore, the drying operation can be performed normally in this case. After the drying is completed, the remaining soft flocks are wet, which may stay for long time and become dry without timely cleaning, resulting in a difficulty in cleaning of the soft flocks. Therefore, in order to avoid remaining soft flocks on the inner wall of the condensing section air duct, after the drying operation is completed, the condensing section air duct 1 needs to be washed again by the cleaning device to ensure that no soft flock remains on the inner wall of the condensing section air duct 1, thereby reducing the difficulty in cleaning of the soft flocks in the condensing section air duct 1.

The step of determining the cleaning strategy for the condensing section air duct 1 according to the comparison result includes: when V1<U1, the cleaning device is started to clean and the fan 3 is controlled to start; when the cleaning is completed once, the outlet air velocity V1 and the outlet temperature T are detected; when the outlet air velocity V1 satisfies V1<U2 and T>T0, the cleaning step is entered and the number of times of consecutive cleaning are accumulated; when the number of times of consecutive cleaning reaches a set number of times, and requirements for the air velocity and temperature are still not met, a step of reporting a fault is entered, where U1<U2.

An amount of the soft flocks in the air duct affects the outlet air velocity. As the amount of the soft flocks increases, the outlet air velocity is gradually decreased. U1 is an air velocity in a critical state of an obstruction determined for the first time; and U2 is a critical air velocity of an obstruction determined after cleaning. After the cleaning, the air velocity is increased, accordingly U1<U2.

When it is detected that V1<U1, it indicates that the condensing section air duct 1 is obstructed with soft flocks, which affects the working performance of the drying air duct. Therefore, the drying air duct needs to be cleaned. At this time, the drying air duct needs to be controlled to enter the cleaning mode; and the cleaning device is utilized to perform a self-cleaning operation on the condensing section air duct 1 of the drying air duct. After the self-cleaning operation is completed once, the drying program is required to operate again. It is detected whether the airflow temperature and air velocity in the air-out section air duct 11 reach set values; when the air velocity at this position satisfies V1≥U2, or the temperature satisfies T≤T0, it indicates that the soft flocks in the condensing section air duct 1 has been cleaned, and the next drying procedure can be performed. If it is still detected that V1<U1 and T>T0, it indicates that there is still obstruction of soft flocks after the cleaning, and the cleaning effect does not meet the requirement, so it is necessary to enter the autonomous cleaning program again; and the cleaning device is continuously controlled to clean the condensing section air duct 1. If continuous operations of the cleaning program for a number of times still fail to meet the requirement, it indicates that there exist other problems causing that the cleaning cannot be completed smoothly. Therefore, it is necessary to report the failure and a repair is required. The number of times of cleaning can be set as required. In this embodiment, when the number of times of consecutive cleaning is five, a fault needs to be reported. After the fault is cleared, or after the drying program is normally entered, the cumulative number of times of cleaning needs to be cleared to zero, to ensure a normal and orderly operation of the cleaning device.

It is easy for those skilled in the art to understand that the above advantageous embodiments can be freely combined and superimposed on the premise of no conflict.

The above are merely some embodiments of the present disclosure and are not intended to limit the disclosure. Any modifications, equivalent replacements and improvements made within the spirit and principle of this disclosure shall be included in the protection scope of the present disclosure. The above are merely some embodiments of the disclosure. It should be pointed out that those of ordinary skill in the art can made several improvements and transformations without departing from the technical principle of the disclosure, and these improvements and transformations should also fall within the scope of protection of the disclosure.

What is claimed is:

1. A drying air duct, comprising a condensing section air duct, a heating section air duct and a fan, wherein the fan is provided at a connection position of the condensing section air duct and the heating section air duct, a cleaning device is provided in the condensing section air duct, and the cleaning device is provided at an end of the condensing section air duct adjacent to the fan and is capable of cleaning the condensing section air duct located on a side of the cleaning device away from the fan, and
wherein the cleaning device comprises a spray pipe which is provided in the condensing section air duct, the spray pipe comprises a pipe body and a spray hole, the spray hole is located only on a side of the pipe body away from the fan, and the spray pipe is configured to spray clean water into the condensing section air duct through the spray hole in a direction away from the fan.

2. The drying air duct according to claim 1, wherein the pipe body is provided with a water inlet, and there are a plurality of spray holes, the plurality of spray holes communicate with the water inlet through an inner cavity of the pipe body, and the plurality of spray holes are spaced in length and width directions of the pipe body.

3. The drying air duct according to claim 1, wherein the pipe body is a round pipe, and the spray hole is a radial hole, the plurality of spray holes are evenly arranged in circumferential and axial directions of the pipe body, the spray holes are located in an area range of 90° to 150° on the pipe body in a circumferential direction.

4. The drying air duct according to claim 1, wherein a bottom of the pipe body comprises two inclined plates forming a V shape, the two inclined plates are respectively provided with the spray holes, and the spray holes are perpendicular to a surface of the inclined plate where the spray holes are located, an angle between the two inclined plates is in a range of 60° to 150°.

5. The drying air duct according to claim 1, wherein an end portion of the pipe body is provided with a connecting plate, and the connecting plate is provided with a connecting hole, the pipe body is fixedly connected to an air duct wall of the condensing section air duct through the connecting plate.

6. The drying air duct according to claim 1, wherein a fixing frame is provided on an outer peripheral wall of the pipe body, the fixing frame is provided with a plurality of ventilation openings, and the pipe body is fixedly provided in the condensing section air duct through the fixing frame.

7. The drying air duct according to claim 6, wherein the plurality of ventilation openings is distributed at both sides of the pipe body, and an airflow is guided by the pipe body to enter the fan from the plurality of ventilation openings on the both sides of the pipe body.

8. The drying air duct according to claim 1, wherein the drying air duct further comprises an air-out section air duct, the air-out section air duct is provided at an air outlet of the heating section air duct, and the air-out section air duct is provided with a temperature sensor and an air velocity sensor.

9. The drying air duct according to claim 8, wherein the temperature sensor and the air velocity sensor are located at a same height, and a cross section of the air-out section air duct is rectangular; in a horizontal cross section, a length of a long side of the air-out section air duct is L, and a length of a short side is h, a depth at which the temperature sensor and the air velocity sensor are inserted into the air-out air duct is H0, a distance between the temperature sensor and a first short side is L1, a distance between the air velocity sensor and the first short side is L2, wherein L1 ranges from 0.2L to 0.4L, L2 ranges from 0.6L to 0.8L, H0 ranges from 0.45h to 0.55h.

10. A clothing treatment device, comprising the drying air duct according to claim 1.

* * * * *